United States Patent
Müller

(10) Patent No.: US 9,638,106 B2
(45) Date of Patent: May 2, 2017

(54) METHOD FOR PULLING A BEARING BODY OFF THE ROTOR OF A GAS TURBINE AND TUBULAR SHAFT EXTENSION

(75) Inventor: Dirk Müller, Mülheim a.d.Ruhr (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 516 days.

(21) Appl. No.: 13/983,126

(22) PCT Filed: Jan. 5, 2012

(86) PCT No.: PCT/EP2012/050125
§ 371 (c)(1),
(2), (4) Date: Aug. 1, 2013

(87) PCT Pub. No.: WO2012/107248
PCT Pub. Date: Aug. 16, 2012

(65) Prior Publication Data
US 2013/0315714 A1 Nov. 28, 2013

(30) Foreign Application Priority Data
Feb. 9, 2011 (DE) .......... 10 2011 010 790

(51) Int. Cl.
| F01D 25/00 | (2006.01) |
| F03B 11/00 | (2006.01) |
| F01D 25/16 | (2006.01) |
| F03B 11/06 | (2006.01) |
| F04D 29/04 | (2006.01) |
| B23P 19/00 | (2006.01) |
| F02C 7/36 | (2006.01) |
| B25B 27/06 | (2006.01) |

(Continued)

(52) U.S. Cl.
CPC ............ F02C 7/36 (2013.01); B25B 27/06 (2013.01); F01D 25/285 (2013.01); F16C 35/00 (2013.01); F05D 2230/70 (2013.01); F05D 2240/50 (2013.01); Y10T 29/49318 (2015.01)

(58) Field of Classification Search
CPC .......... Y10T 29/49318; F05D 2230/70; F05D 2240/50; F01D 25/285; F02C 7/36; F16C 2237/00; F16C 2226/00; F16C 43/00; B25B 27/06
USPC .......... 29/426.5, 426.1, 889.1, 244; 415/229
See application file for complete search history.

(56) References Cited

U.S. PATENT DOCUMENTS

| 3,124,870 A | 3/1964 | Hugoson |
| 3,403,434 A | 10/1968 | Calabro |

(Continued)

FOREIGN PATENT DOCUMENTS

| CN | 1646791 A | 7/2005 |
| DE | 19643336 A1 | 4/1998 |

(Continued)

Primary Examiner — Sarang Afzali
Assistant Examiner — Darrell C Ford

(57) ABSTRACT

A method is provided for pulling a bearing body off the rotor of a gas turbine having a casing, while the casing is closed. The method includes fixing a shaft extension on the relevant end of the rotor. In order to free the bearing body of the weight of the rotor, the method involves supporting the rotor and/or holding the rotor. The method further includes fitting sliding elements between the bearing body and the rotor, and moving the bearing body axially along the machine axis onto the shaft extension.

12 Claims, 5 Drawing Sheets

(51) Int. Cl.
   *F01D 25/28* (2006.01)
   *F16C 35/00* (2006.01)
   *B23P 19/04* (2006.01)

(56) References Cited

U.S. PATENT DOCUMENTS

| | | | |
|---|---|---|---|
| 3,467,811 A | 9/1969 | Consoletti | |
| 3,790,356 A * | 2/1974 | Bergling | B63H 23/321 |
| | | | 248/351 |
| 4,451,979 A | 6/1984 | Schuster | |
| 4,487,014 A * | 12/1984 | Vinciguerra | F02C 7/20 |
| | | | 415/220 |
| 4,635,336 A | 1/1987 | Ades | |
| 5,251,368 A | 10/1993 | Somerville | |
| 5,542,642 A * | 8/1996 | Rivard | F01D 25/28 |
| | | | 248/676 |
| 6,141,862 A * | 11/2000 | Matsui | F01D 25/285 |
| | | | 29/278 |
| 6,293,146 B1 * | 9/2001 | Jin | G01M 1/045 |
| | | | 73/462 |
| 6,582,187 B1 * | 6/2003 | Shockley | F01D 25/125 |
| | | | 415/111 |
| 7,316,538 B2 * | 1/2008 | Bouchy | F01D 21/045 |
| | | | 411/916 |
| 9,188,007 B2 * | 11/2015 | Edwards | F01D 25/16 |
| 2005/0031438 A1 * | 2/2005 | Copus | B60P 1/28 |
| | | | 414/467 |
| 2007/0075548 A1 * | 4/2007 | Bagepalli | F03D 1/003 |
| | | | 290/55 |
| 2009/0285693 A1 * | 11/2009 | Bech | F03D 1/003 |
| | | | 416/248 |
| 2010/0158699 A1 * | 6/2010 | Makuszewski | F01D 5/066 |
| | | | 416/244 A |
| 2011/0000218 A1 * | 1/2011 | Arase | F01D 25/246 |
| | | | 60/772 |
| 2012/0317771 A1 * | 12/2012 | Zhang | F01D 25/285 |
| | | | 29/402.01 |
| 2014/0050566 A1 * | 2/2014 | Race | F01D 5/027 |
| | | | 415/119 |
| 2016/0052646 A1 * | 2/2016 | Aoki | F01D 25/285 |
| | | | 29/407.05 |

FOREIGN PATENT DOCUMENTS

| | | |
|---|---|---|
| EP | 0834645 A1 | 4/1998 |
| GB | 2320527 A | 6/1998 |
| JP | S57114334 A | 7/1982 |
| JP | S57106356 U | 8/1982 |
| JP | H10110623 A | 4/1998 |
| JP | 200598167 | 10/2005 |
| RU | 2055724 C1 | 3/1996 |

* cited by examiner

METHOD FOR PULLING A BEARING BODY OFF THE ROTOR OF A GAS TURBINE AND TUBULAR SHAFT EXTENSION

CROSS REFERENCE TO RELATED APPLICATIONS

This application is the US National Stage of International Application No. PCT/EP2012/050125 filed Jan. 5, 2012 and claims benefit thereof, the entire content of which is hereby incorporated herein by reference. The International Application claims priority to the German application No. 10 2011 010 790.8 DE filed Feb. 9, 2011, the entire contents of which is hereby incorporated herein by reference.

FIELD OF INVENTION

The invention relates to a method for pulling a bearing body off the rotor of a preferably stationary gas turbine having a casing which can preferably be divided into halves, while the casing is closed. The invention furthermore relates to a tubular shaft extension for parking a bearing body of a rotor of a preferably stationary gas turbine having a casing which can preferably be divided into halves.

BACKGROUND OF INVENTION

Stationary gas turbines have long been known from the extensive prior art. The rotors thereof are generally supported radially both at a compressor end and at a turbine end. The turbine-end radial bearing of gas turbines is situated within the exhaust section of the gas turbine, generally directly after the last guide vane cascade of the turbine unit. For support, there is generally a small number of radially extending bearing struts in the exhaust section, i.e. four, five or six such struts, in the center of which a bearing housing for the bearing body of the turbine-end radial bearing is located.

Faults in the bearing body or in the bearing shells can lead to a need to replace said components. In the case of stationary gas turbines, which are generally fitted with a casing which can be divided into halves in a parting plane, the upper casing half of the stationary gas turbine must first be released from the lower casing half and then lifted off in the event of a repair. The rotor including the bearing must then be removed from the lower casing half, and only then can the bearing be pulled off the rotor.

However, this procedure is particularly time-consuming since a relatively long preparation time is required after the cooling of the gas turbine in order to release the screwed joints of the casing, open the gas turbine and remove the rotor. After the faulty component has been repaired, the rotor must be replaced in the lower casing half and aligned. The upper casing half is then fitted. After this, the casing halves have to be fastened to one another by means of the known screwed joints, and this likewise greatly increases the downtime of the stationary gas turbine.

SUMMARY OF INVENTION

For these reasons, there is a need to shorten the downtime of the gas turbine.

It is therefore an object of the invention to provide a method that overcomes the abovementioned disadvantages. It is a further object of the invention to provide a tool which supports the method.

The object as it is directed to the method is achieved by the following steps:
fixing a shaft extension (18) on the relevant end (20) of the rotor (12),
a) supporting the rotor (12) and/or
b) holding the rotor (12) in order to free the bearing body (10) of the weight of the rotor,
fitting sliding elements between the bearing body and the rotor and
moving the bearing body axially along the machine axis onto the shaft extension.

Further advantageous embodiments and features are given in the dependent claims.

According to the invention, provision is made for fixing a shaft extension on the relevant end of the rotor. The relevant radial bearing is then freed of the weight of the rotor by supporting the rotor from below and/or holding it from above. Through the freeing of the radial bearing from the radially acting weight-associated forces of the rotor, the latter is first of all fixed indirectly, with radial clearance, on the radial struts. The sliding elements, which are provided only for disassembly and assembly, are then fitted between the bearing body and the rotor. After this, the bearing body can be moved onto the shaft extension and parked there for the repair work to be carried out thereon. In the parked position, the bearing body is secured against any further movement. At the same time, it is accessible from all sides. The free accessibility of the bearing body then allows it to be repaired within the exhaust casing of the gas turbine without the need to open up the gas turbine for this purpose. The opening of the upper casing half of the stationary gas turbine and the removal of the rotor are eliminated completely. This significantly reduces the preparation time for the repair of the relevant bearing and thus increases the availability of the gas turbine to the same degree.

According to a first advantageous embodiment of the method, the bearing body is of undivided configuration in the circumferential direction. The integral embodiment of the bearing body is a particularly simple way of allowing the bearing body to be moved along the shaft extension. Moreover, there is no need for adjustment of any bearing body halves relative to the rotor during the installation of the bearing body that has to be carried out after the repair. Consequently, this measure too allows particularly rapid removal and installation of the bearing body.

According to a particularly preferred method, the bearing body is secured against rotation or pivoting during and after axial movement by means of an anti-rotation device. This measure increases workplace safety for the fitters carrying out the movement and repair since uncontrolled movement of the bearing body during the axial movement and then in the parked position cannot occur.

At least one guide extending in the axial direction is preferably provided as an anti-rotation device on the shaft extension, said guide limiting the tangential movement of a pin fixed rigidly on the bearing body when there is a risk of rotary motion of the bearing body. The advantage of this embodiment of an anti-rotation device lies in its suitability for simple and low-cost manufacture. For example, the guide is embodied as a U-profile, along the outward-facing web of which the pin can slide with a particularly small clearance. Thus, the two edges of the U-profile, which lie on a larger radius than the center of the web, limit the movement of the pin in the circumferential direction, reliably preventing tangential movement of the bearing body when there is a risk of such movement. Instead of the U-profile, it is, of course, also possible to use in a similar way a flat profile mounted on the outside, perpendicularly to the radius of the shaft extension. This is of flatter construction and allows the use of the method with bearing bodies that have a relatively small inside diameter as well.

It is expedient if the shaft extension is fixed on the relevant end of the rotor in such a way that it can be released again. For this purpose, provision is made for the shaft extension to be screwed onto the end of the rotor. This embodiment is advantageous particularly for rotors of a kind which are in any case embodied with a central tie rod and the end of which is in any case provided with a thread. Adaptation of rotors of this kind for carrying out the method according to the invention is not necessary.

It is a particularly simple matter to align the shaft extension before screwing it onto the rotor if the shaft extension is resting on a roller bracket which, for its part, is supported so as to allow radial and tangential movement. Accordingly, the roller bracket is positioned in such a way that the shaft extension can be screwed onto the rotor without misalignment. On conclusion of positioning, the shaft extension, which is designed as a tube, is rotated on the roller bracket and, in the process, simultaneously screwed onto the rotor. Damage to the thread forming part of the screwed joint is thereby reliably prevented.

The bearing body is preferably supported on the rotor and/or on the extension thereof at two axial positions by means of the sliding elements. This prevents tilting of the bearing body relative to the rotor or the rotor extension, ensuring that it is always concentric and coaxial with the machine axis.

According to the invention, the tubular extension for parking a bearing body of a rotor of a preferably stationary gas turbine having a casing which can preferably be divided into halves has an internal thread at one end for screwing the shaft extension onto one end of the rotor of the gas turbine and at least one guide, arranged on the outside of the shaft extension, for forming one of two mating parts of an anti-rotation device for the bearing body, which can be moved along the shaft extension.

The advantages relating to the shaft extension correspond here to the advantages of the method.

BRIEF DESCRIPTION OF THE DRAWINGS

Further advantages, features and characteristics of the invention are explained in greater detail by means of a preferred illustrative embodiment in the following drawings, in which.

DETAILED DESCRIPTION OF INVENTION

Figure 1:
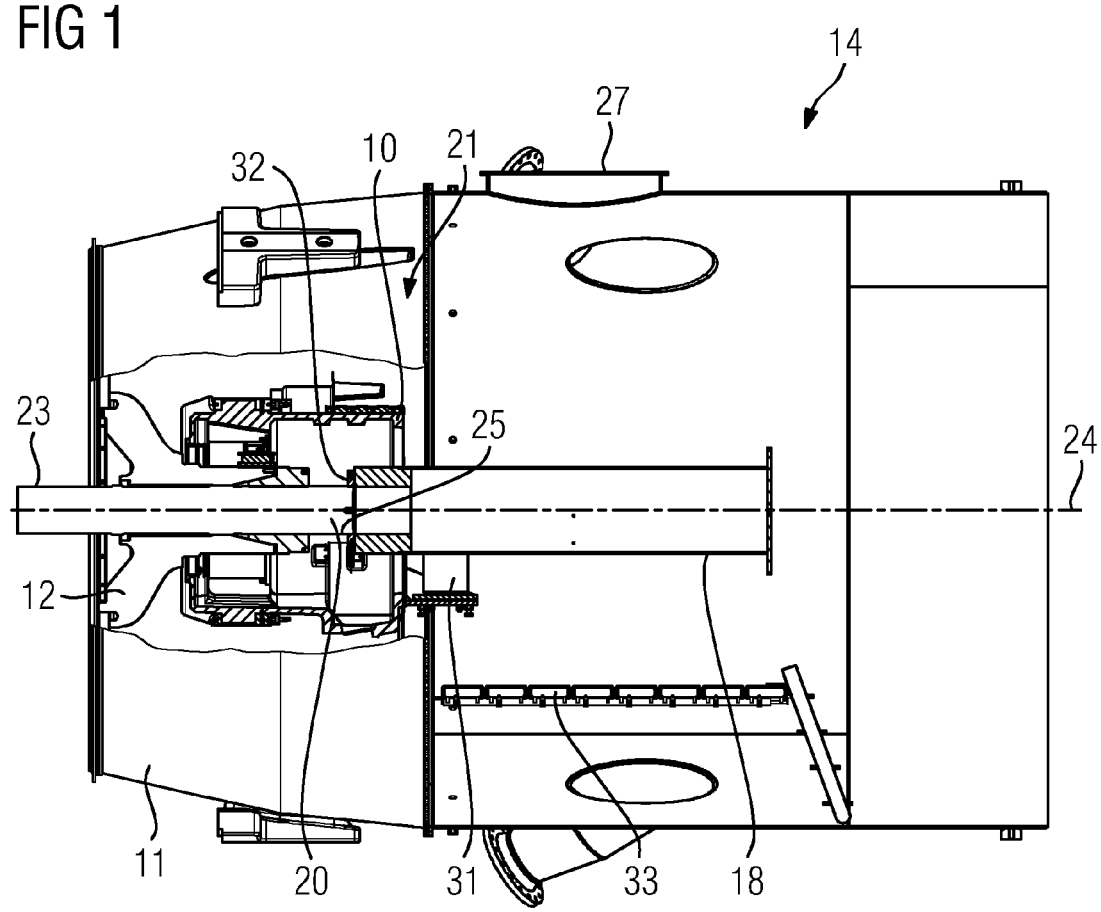
FIG. 1 shows a longitudinal partial section through the turbine end of a stationary gas turbine.
Figure 2:
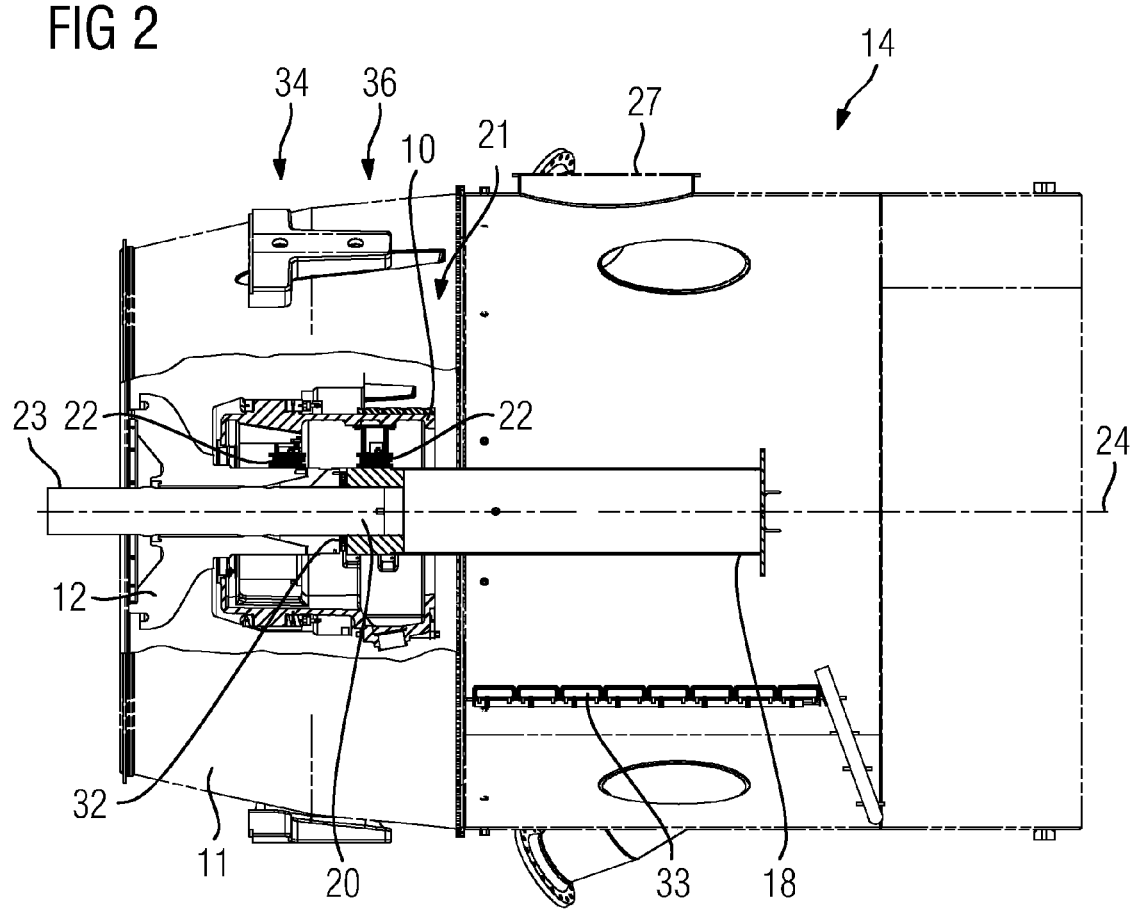
FIG. 2 shows the longitudinal partial section according to FIG. 1 with sliding elements arranged between the bearing body and the rotor.

FIG. 1 shows a turbine exhaust casing 11 of a stationary gas turbine 14 in a longitudinal partial section. Upstream of the turbine exhaust casing 11, the gas turbine 14 has a casing which can be divided in half, having a lower casing half and an upper casing half (not shown), which are connected to one another flange-fashion in a known manner and are screwed to one another by appropriate screwed joints. The turbine exhaust casing 11 of the gas turbine 14 is of undivided configuration and delimits an exhaust duct 21. Five bearing struts 15 (FIGS. 3, 4) extending in the radial direction are distributed uniformly therein along the circumference, jointly supporting and holding a bearing housing radially on the inside. A bearing body 10 for radial support of a rotor 12 of the gas turbine 14 is provided in the bearing housing. In the embodiment of the gas turbine 14 which is shown in FIG. 1, the rotor 12 is of disk-type construction, with a tie rod 23 extending centrally through the disks. The tie rod 23 is also provided with a thread 25 at the turbine end, onto which thread a shaft extension 18 can be screwed. The shaft extension 18 is introduced into the exhaust duct 21 of the gas turbine 14 through an access 27 for fitters with the aid of a crane (not shown specifically) and is then lowered onto a roller bracket 31. With the aid of the roller bracket 31, which comprises a pair of rollers, the shaft extension 18 can be positioned in such a way relative to the tie rod end 20 of the rotor 12 that said rotor can be screwed onto the tie rod end 20 without misalignment. According to FIG. 1, the shaft extension 18 has not yet been screwed onto the tie rod end 20. After the shaft extension 18 has been screwed on (FIG. 2), said extension is secured against release with the aid of a locknut 32.

The rotor 12 is then supported directly on the turbine exhaust casing 11 of the gas turbine 14 at the turbine end via elements (not shown specifically), thus freeing the bearing body 10 from the weight of the rotor 12. Commercially available clamping elements of the "Superbolt" brand through Nord-Lock Switzerland GMBH LLC, in particular, are suitable for this purpose. At the same time or afterwards, sliding elements 22 or, alternatively, sliding shoes are then fitted between the bearing body 10 and the rotor 12 or shaft extension 18, thus enabling the bearing body 10 to be moved along the machine axis 24 with the aid of said sliding elements 22. The bearing body is preferably supported on the rotor and/or on the extension thereof at two axial positions 34, 36 by means of the sliding elements.

It should be noted that the bearing shells that are usually provided in the bearing body 10 are not shown in any of the figures shown here and can be removed from the bearing body 10 even before fixing the shaft extension 18 on the relevant tie rod end 20.

Figure 3:
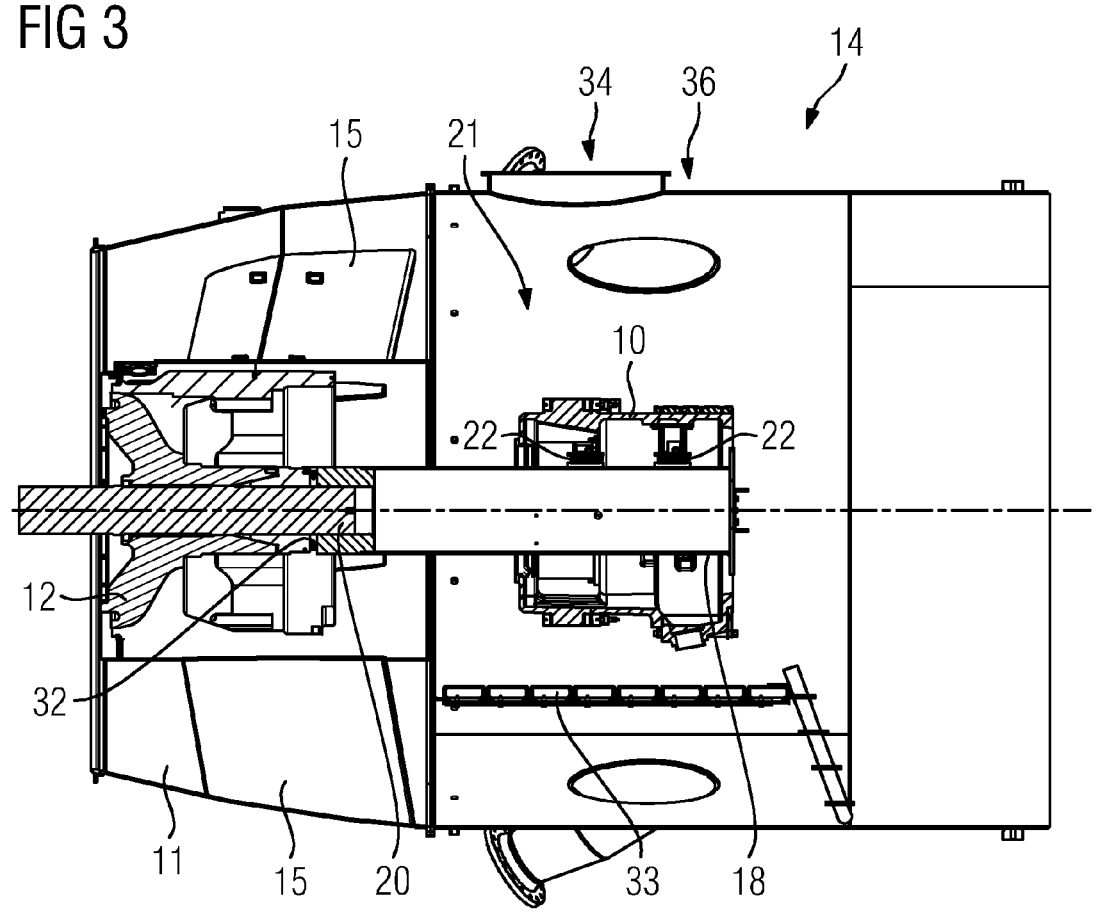
FIG. 3 shows the longitudinal section according to FIG. 1 with a bearing body moved onto a shaft extension.
Figure 4:
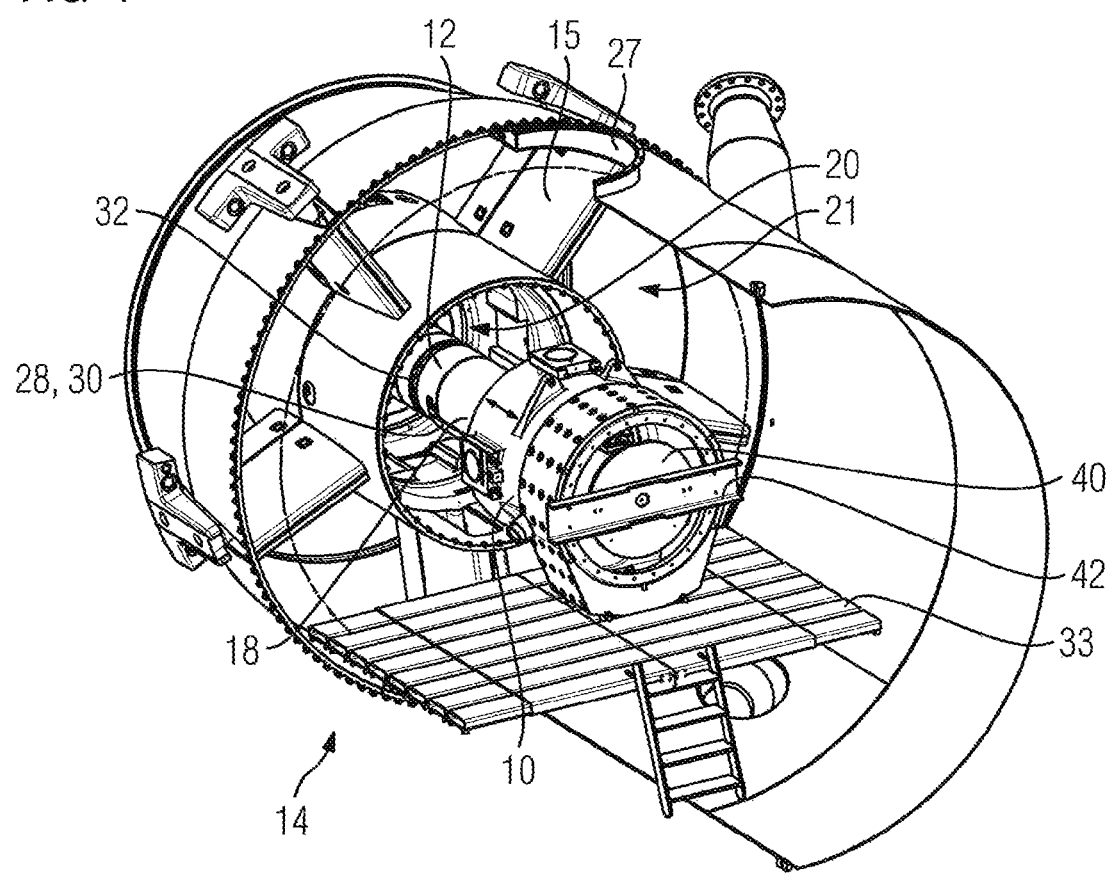
FIG. 4 shows an exhaust duct of a gas turbine in perspective, partially sectioned representation with a shaft extension screwed onto a rotor end and the bearing body moved thereon.

The bearing body 10 can then be pushed along the machine axis 24, onto the shaft extension, by axial movement—i.e. translation—and parked there (FIGS. 3, 4). After movement onto the shaft extension 18, the bearing body 10 is secured temporarily for the duration of the planned work. Repair work by a fitter within the bearing housing or on the bearing body 10 is thus possible without the need to open the gas turbine 14 and remove the rotor 12 thereof. In order to facilitate work on the bearing body 10, a working stage 33 or working platform, on which a fitter can carry out the repair work, can be mounted temporarily in the interior of the exhaust duct 21.

Figure 5:
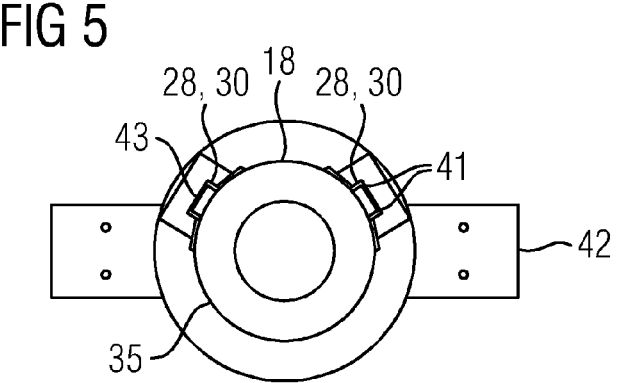
FIG. 5 shows a cross section through the shaft extension.
Figure 6:
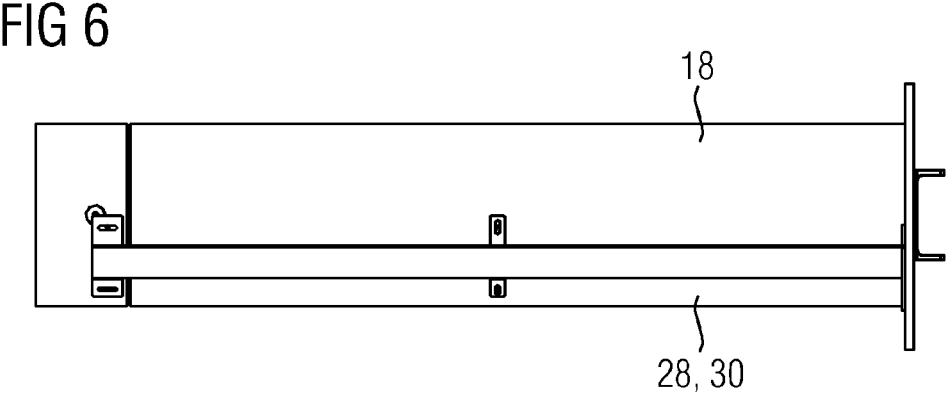
FIG. 6 shows a side view of the shaft extension.
Figure 7:
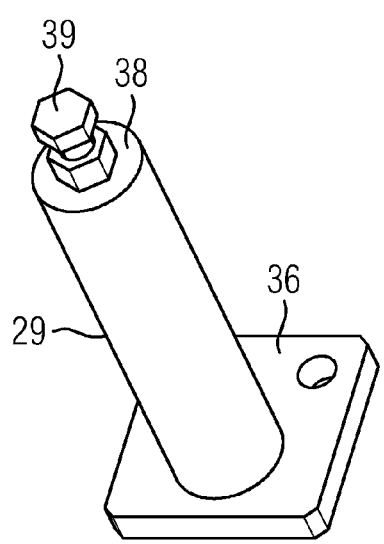
FIG. 7 shows a pin, which can be fixed on the bearing body and has a bolt arranged on the end face for adjusting a clearance dimension.

In FIG. 5, the tubular shaft extension 18 is shown in a cross section and, in FIG. 6, is shown in a side view. In principle, the extension 18 is provided as a tube with an internal thread arranged at the end. In addition, the shaft extension 18 has, on the outside 35 thereof, two guides 28 extending in the longitudinal direction. According to FIG. 5, the guide 28 is embodied as a U-profile, which is fixed on the outside of the shaft extension 18. The U-profile is fixed on the shaft extension 18 in such a way that its flanks rests on the outer surface and the web 30 extending between the flanks faces outward. The U-profile is one of two mating parts of an anti-rotation device. According to the embodiment of the shaft extension 18 illustrated in FIGS. 5 and 6, two such guides 28 are provided on the outer surface of the shaft extension 18. When the shaft extension 18 is aligned, they are situated symmetrically on both sides of a 12:00 o'clock position.

The second mating part required to form the anti-rotation device 26 is illustrated in perspective in FIG. 6. The second mating part merely comprises a pin 29 which can be fixed on the bearing body 10 and the free end 38 of which, which projects inward in the assembled position, is provided on the end face with a bolt 39 for adjusting the clearance dimension with respect to the web 30 of the guide 28.

During the implementation of the method according to the invention, the bolt 39 mounted on the pin end 29 is unscrewed from the pin 29 until its lies opposite a web center 43 of the U-profile with a particularly small clearance. The edges 41 between the flank and the web 30 of the U-profile lie on a larger radius than the web center 43 between the two edges 41. If there is a risk of tangential movement of the bearing body 10—i.e. movement in the circumferential direction—this movement is blocked since the bolt 39 strikes against the edge 41 due to the relatively small clearance between the web center 43 and said bolt. It is thereby possible reliably to avoid a rotary motion of the bearing body 10 during and after movement onto the shaft extension 18, which would endanger the fitters. At its free end 40, the shaft extension 18 furthermore has a stop 42 in the form of a plate, which serves to limit the axial travel of the bearing body 10. This reliably avoids the possibility of the bearing body 10 being pushed off the shaft extension 18.

A flat profile is also suitable as a bearing surface or guide instead of the U-profile. This is then fixed on the shaft extension 18 in such a way that the flat side thereof is aligned perpendicularly to the radius of the shaft extension and parallel to the machine axis 24. The same effect as that achieved with the U-profile is thereby obtained.

Overall, the invention relates to a method for pulling a bearing body 10 off the rotor 12 of a preferably stationary gas turbine 14 having a casing which can preferably be divided into halves, while the casing is closed. In order to reduce the assembly and disassembly time when repairing a bearing body 10 of a corresponding gas turbine 14, provision is made, according to the invention, for fixing a shaft extension 18 on the relevant end 20 of the rotor 12 and the rotor 12 is simultaneously supported and/or held in order to free the bearing body 10 of the weight of the rotor 12. Sliding elements 22 are then fitted between the bearing body 10 and the rotor 12, after which the bearing body 10 can be pushed along the machine axis 24 onto the shaft extension 18 and parked there.

The invention claimed is:

1. A method for pulling a bearing body off a rotor of a gas turbine engine, the gas turbine engine having a casing, while the casing is closed, the method comprising:
    fixing a removable shaft extension on an end of the rotor, and at least one of:
        supporting the rotor on a turbine exhaust casing, and holding the rotor from above,
        in order to free the bearing body of the weight of the rotor;
    fitting sliding elements between the bearing body and the rotor along an axis that is substantially perpendicular to a machine axis such that the bearing body can be moved relative to the machine axis; and
    moving the bearing body axially along the machine axis off of the rotor onto the shaft extension.

2. The method as claimed in claim 1,
wherein the bearing body is of undivided configuration in the circumferential direction.

3. The method as claimed in claim 1, further comprising:
securing the bearing body against rotation during and after axial movement with the aid of an anti-rotation device.

4. The method as claimed in claim 3, further comprising:
providing at least one guide extending in an axial direction as an anti-rotation device on the shaft extension, the guide limiting the tangential movement of a pin fixed on the bearing body when there is a risk of rotary motion of the bearing body.

5. The method as claimed in claim 4,
wherein the guide is embodied as a U-profile, along an outward-facing web of which the pin can slide with a small clearance.

6. The method as claimed in claim 4,
wherein the guide is embodied as a flat profile, a flat side of which extends perpendicularly to the radius of the shaft extension and parallel to the machine axis.

7. The method as claimed in claim 1,
wherein the shaft extension is screwed onto the end of the rotor.

8. The method as claimed in claim 7, further comprising:
aligning the shaft extension relative to the rotor with the aid of a roller bracket to enable the shaft extension to be screwed onto the rotor without misalignment.

9. The method as claimed in claim 7, further comprising:
positioning and securing the shaft extension which is screwed onto the rotor against rotation with the aid of a locknut.

10. The method as claimed in claim 1, further comprising:
supporting the bearing body on the rotor or the extension of the rotor at two axial positions via the sliding elements.

11. The method as claimed in claim 1,
wherein the gas turbine is a stationary gas turbine.

12. The method as claimed in claim 1,
wherein the casing is configured such that the casing can be divided into halves.

* * * * *